(12) United States Patent
Zappella et al.

(10) Patent No.: US 10,049,375 B1
(45) Date of Patent: Aug. 14, 2018

(54) AUTOMATED GRAPH-BASED IDENTIFICATION OF EARLY ADOPTER USERS

(71) Applicant: Amazon Technologies, Inc., Seattle, WA (US)

(72) Inventors: Giovanni Zappella, Berlin (DE);
Marcel Ackermann, Berlin (DE);
Rodolphe Jenatton, Berlin (DE);
David Spike Palfrey, Cambridge (GB);
Samuel Theodore Sandler, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 476 days.

(21) Appl. No.: 14/666,023

(22) Filed: Mar. 23, 2015

(51) Int. Cl.
*G06Q 30/02* (2012.01)
*G06F 17/30* (2006.01)

(52) U.S. Cl.
CPC ... *G06Q 30/0202* (2013.01); *G06F 17/30353* (2013.01); *G06F 17/30598* (2013.01); *G06F 17/30864* (2013.01); *G06F 17/30958* (2013.01)

(58) Field of Classification Search
CPC ......... G06F 17/30716; G06F 17/30902; G06F 9/5083; G06F 9/5011; G06F 9/5027; G06F 9/5077; G06F 9/50; G06F 9/5061; G06F 15/16; H04W 40/20; H04L 67/2852; H04L 67/28; H04L 67/2847; H04L 67/10; H04L 67/2842; H04L 67/02; H04L 67/289; H04L 29/08144; H04L 41/141; H04L 43/0876; H04L 43/0882; H04L 47/762; H04L 47/745; H04L 67/1002; H04L 67/1008; H04L 67/1029; H04L 67/2838; H04L 29/12132; H04L 47/10; H04L 67/2885; H04L 12/011; G06Q 40/00

(Continued)

(56) References Cited

U.S. PATENT DOCUMENTS 6,049,778 A    4/2000   Walker et al.
6,278,966 B1 * 8/2001   Howard .............. G06F 11/3414
                                                    703/22

(Continued)

OTHER PUBLICATIONS

U.S. Appl. No. 14/034,430, filed Sep. 23, 2013, McGilliard.

(Continued)

*Primary Examiner* — Robert D Rines
*Assistant Examiner* — Gerald C Vizvary
(74) *Attorney, Agent, or Firm* — Knobbe, Martens, Olson & Bear, LLP (57) ABSTRACT

A system is disclosed that identifies early adopter users by creating a directed graph of item access information for an item category and performing a page rank type process on the item access information. This directed graph may be created in a reverse temporal order. The early adopter users can be identified as the users with nodes in the directed graph that have a threshold number or rate of incoming links directly or indirectly pointing towards the nodes. Using the early adopter users as a sample, systems herein can determine whether to recommend an item based on the popularity of the item with respect to the early adopter users. Further, systems herein can determine an inventory level to maintain for an item based on the popularity of the item with respect to the early adopter users.

20 Claims, 5 Drawing Sheets

(58) Field of Classification Search
USPC .................. 1/1; 370/400; 703/23; 705/37;
709/226, 200
See application file for complete search history.

(56) References Cited

U.S. PATENT DOCUMENTS

| | | | |
|---|---|---|---|
| 6,912,505 B2 | 6/2005 | Linden et al. | |
| 7,536,322 B1 | 5/2009 | Selinger et al. | |
| 7,685,074 B2 | 3/2010 | Linden et al. | |
| 8,175,989 B1 | 5/2012 | Gopinath et al. | |
| 8,260,656 B1 | 9/2012 | Harbick et al. | |
| 9,639,848 B1 | 5/2017 | Belle et al. | |
| 2002/0082901 A1 | 6/2002 | Dunning et al. | |
| 2003/0135513 A1 | 7/2003 | Quinn et al. | |
| 2004/0260600 A1 | 12/2004 | Gross | |
| 2005/0228856 A1* | 10/2005 | Swildens | G06F 9/50 709/200 |
| 2006/0010029 A1 | 1/2006 | Gross | |
| 2006/0167784 A1* | 7/2006 | Hoffberg | G06Q 20/401 705/37 |
| 2006/0265489 A1* | 11/2006 | Moore | H04L 69/40 709/223 |
| 2007/0025364 A1* | 2/2007 | Kodialam | H04L 47/14 370/400 |
| 2007/0124312 A1* | 5/2007 | Simpson | G06Q 10/107 |
| 2008/0077568 A1 | 3/2008 | Ott | |
| 2008/0097955 A1 | 4/2008 | Kapur | |
| 2010/0121857 A1 | 5/2010 | Elmore et al. | |
| 2011/0145130 A1* | 6/2011 | Glodjo | G06Q 20/10 705/37 |
| 2013/0117349 A1 | 5/2013 | Burnette | |
| 2013/0173368 A1 | 7/2013 | Boutin et al. | |
| 2014/0280952 A1* | 9/2014 | Shear | H04L 47/70 709/226 |

OTHER PUBLICATIONS

Page, et al., "The PageRank Citation Ranking: Bringing Order to the Web", Jan. 29, 1998, 17pgs.
"PageRank", Wikipedia, http://en.wikipedia.org/wiki/PageRank, Mar. 17, 2015, 12 pgs.

* cited by examiner

```
fictitiousUserWeight = 0.1
#nodes are users
def addWeight(G, node1, node2, weight):
    if G.has_edge(node1, node2):
        G[node1][node2]['weight'] += weight  #the edge is already in the graph so we only need to increase its weight
    else:
        G.add_edge(node1, node2, weight=weight)  #we have not seen this connection of two users before
```
⎫
⎬ 402
⎭

```
G=Graph()
    for line in inputFile: #read the file in the format: ITEM, USER, DATE_TIME –
                           which is sorted first by items and then by time
        user, item, date = tuple(line.split())
        if itemBefore == item: #the previous user purchased the same item,
                               so the user is a more influential user/early adopter
            addWeight(G, userBefore, user, 1)
            addWeight(G, userBefore, "fictitiousUser", fictitiousUserWeight)
            addWeight(G, user, "fictitiousUser", fictitiousUserWeight)
        itemBefore = item
        userBefore = user
```
404

Rank(G) ——— 406

AUTOMATED GRAPH-BASED IDENTIFICATION OF EARLY ADOPTER USERS

BACKGROUND

Automated processes exist for identifying users who tend to be early adopters of new items and technologies. These processes typically analyze the online behaviors of users, in conjunction with item release dates and item popularity data, to identify those who tend to purchase (or otherwise adopt) items before such items become popular. The actions of such early adopter users can be used by item recommendation systems to improve item recommendations, and by inventory management systems to more accurately predict and manage item inventory levels.

One problem with existing processes for identifying early adopter users is that they often fail to consider the degree to which particular users are influential. Another problem is that existing processes cannot distinguish between early adopter users and users who are not early adopter users, but who purchase some items upon release coincidentally.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION

Introduction

Determining an appropriate inventory level for an item can be important aspect of running a business. One method for determining how much inventory to maintain for an item is to analyze how well the item sells among users who are identified as early adopter users. Early adopter users can include users who tend to purchase items earlier than most users. For example, early adopter users may include users who like to purchase or obtain the latest technology or a newest version of an item upon release of the item for sale or to the general public. By identifying early adopter users, it is possible to determine how well an item is likely to sell to users based on how well the item sells among early adopter users. Identifying such users can be especially important for determining which items may become popular at a later point in time. Further, by determining how well an item is likely to sell, an inventory management system of an organization can determine an inventory level to maintain for the item. Determining an inventory level or an amount of inventory to maintain for an item can be important to organizations that maintain physical items for distribution to users. Further, determining an inventory level to maintain can be particularly important to electronic commerce ("ecommerce") organizations that may not have brick and mortar retail locations but may instead manage warehouses or purchase access to other organizations' warehouses.

Another important aspect of a successful business is the ability to provide effective recommendations, which generally include recommendations that result in a conversion or a sale. Organizations can use sales information among early adopter users to determine whether to recommend the item to other users. In some cases, actions of early adopter users can be given more weight by a recommendation system, such as that disclosed herein, to facilitate determining an item to recommend. In some cases, a recommendation system of an organization can determine which items to recommend to a user based on an association between particular users and a group of early adopter users who accessed, or did not access, one or more of the item.

Embodiments of systems and processes herein use item access information to create a directed graph of users who access items of a particular item type. This directed graph of users can be created in a reverse temporal order so that a link between two nodes, corresponding to two users, points from the node associated with the user who accessed the item later in time to the node associated with the user to access the item earlier in time. Further, systems and processes herein can perform a page rank type process, or other centrality-based measurement process, on the directed graph to identify the early adopter users from the set of users with nodes included in the directed graph. Page rank is a well understood algorithm for ranking web pages (e.g., for display in a set of web page search results) that are important based on the number of links that point to the web pages. Embodiments herein can use a modified version of the page rank process, or other centrality-based measurement process, to identify early adopter users. These early adopter users can be identified as the users with nodes in the directed graph that have a threshold number or rate of links directly or indirectly pointing towards the nodes.

Embodiments of systems and processes herein can use the identified early adopter users to facilitate maintaining an inventory for an item. For example, systems herein can determine whether the number of early adopter users who access the item satisfies one or more thresholds. Using this information relating to the number of early adopter users who satisfy the one or more thresholds, the systems and processes herein can set an inventory level for the item. Further, systems and processes herein can determine whether to recommend the item to other users based on whether the number of early adopter users who access the item satisfies the one or more thresholds.

As used herein, the term "item" is used interchangeably to refer to an item itself (e.g., a particular product) and to its description or representation in an electronic catalog system. As will be apparent from the context in which it is used, the term is also sometimes used herein to refer only to the item itself or only to its representation in the catalog system. Further, the term "item" is not limited and may include physical products, digital products, services, electronic currency, gifts, etc. Moreover, the term "access" may refer to any interaction with an item. For example, access may include purchasing the item, renting the item, obtaining an instance of the item, viewing the item, viewing an item-detail page associated with the item, adding an item to a shopping cart, adding the item to a wish list, adding the item to a registry, downloading information associated with the item, or otherwise indicating an interest in an item.

In certain embodiments, an early adopter user may include a user who purchases a threshold number or threshold percentage of items within a threshold time period after the items are made available for access or are included in an electronic catalog generated by a catalog service. In some cases, different users may be identified as early adopter users for different item categories. In other words, the user who is identified as an early adopter user for one item category may or may not be identified as an early adopter user for another item category.

Example Directed Graph

Figure 1:
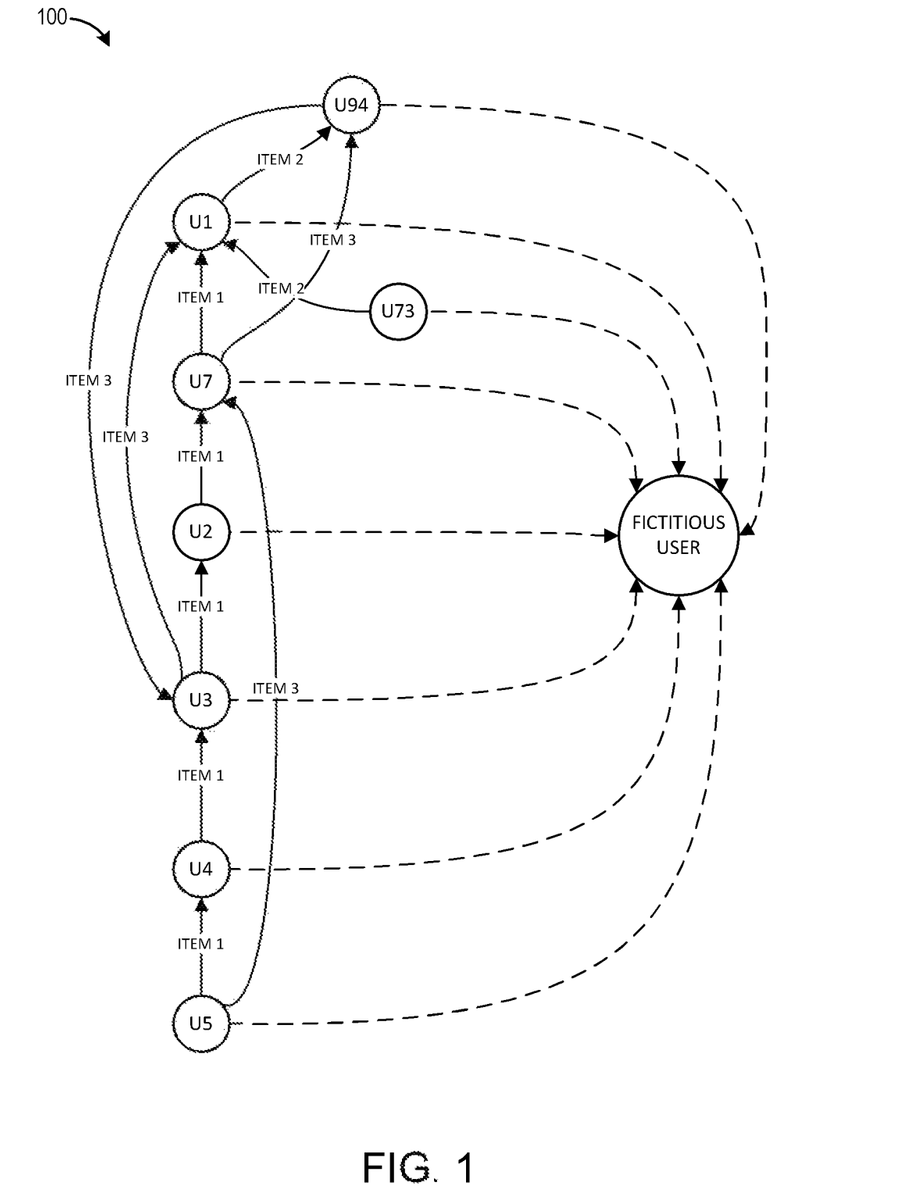
FIG. 1 illustrates an embodiment of a directed graph for identifying early adopter users.

FIG. 1 illustrates an embodiment of a directed graph 100 for identifying early adopter users. The directed graph 100 can be a composite directed graph created by the system from multiple directed graphs. Each of the directed graphs used to create the composite directed graph can be associated with a different item. Generally, although not necessarily, each directed graph is associated with an item from the same item category as the other directed graphs used to create the composite directed graph 100. For example, the item category may be fictional books about zombies and each directed graph used to create the composite directed graph 100 may be for a different zombie book.

TABLE 1

| Item Category | | | | | |
|---|---|---|---|---|---|
| Item 1 | | Item 2 | | Item 3 | |
| User | Access Time | User | Access Time | User | Access Time |
| U1 | 1 | U94 | 9 | U1 | 3 |
| U7 | 3 | U1 | 11 | U3 | 74 |
| U2 | 4 | U73 | 14 | U94 | 91 |
| U3 | 5 | | | U7 | 92 |
| U4 | 9 | | | U5 | 94 |
| U5 | 12 | | | | |

Table 1 includes example item access data for items of an example item category that can be used to create the composite directed graph 100. As can be determined by comparing the data from Table 1 with the directed graph 100, the directed graph 100 is formed in a reverse temporal order. For example, as user U1 accesses item 1 at access time 1 and user U7 accesses item 1 at access time 3, the link between the node U1 and U7, corresponding to users U1 and U7 respectively, in the graph 100 can be a directed link pointing from U7 to U1. In some embodiments, the "access" events consist of item purchases; in other embodiments, other types of user actions, such as the download of an item, the submission of a review or rating of an item, or the addition of an item to a wish list, may be treated as an access.

Although the nodes are generally described as corresponding to individual users, in some cases, a node may correspond to a group of users. For example, in some cases, a node may correspond to a corporation or other organization.

Further, as illustrated in FIG. 1, the composite directed graph 100 can include an unassigned, virtual, reference, fictional, or fictitious user. This fictitious user may be a node that is not associated with a real or human user, or customer organization, but is instead created for the purpose of differentiating early adopter users from users who access a large number of items. In some cases, a node corresponding to a particular user may have a large number of incoming links relative to nodes corresponding to other users. This particular user may be an early adopter user. However, this user may also be a user who accesses many items, but is not necessarily an early adopter user. In some embodiments, the fictitious user can be used to help differentiate between the user who is an early adopter user and the user who is misidentified as such due to the relatively large number of item accesses.

Each user who accesses an item may have a directed link to the fictitious user. Thus, every node in the directed graph 100 will have a link to the node associated with the fictitious user. Further, in some embodiments, for each user in a chain of users who accesses an item, a weight on the link between the chain of users and the fictitious user may be modified. Generally, the weight may be increased. However, it is possible to reduce the weight on the link pointing to the node of the fictitious user instead. By adjusting the weight, the node associated with the fictitious user can be maintained as the top user in a list of users generated using, for example, a page rank algorithm or other centrality-based measurement process on the directed graph 100. The weight applied to the link between a user and the fictitious user may be modified by each purchase made by the user. For example, the weight on the link between the user and the fictitious user may be increased for each purchase. In some embodiments, a weight applied to a link between two non-fictitious users may remain static for each purchase or may also be modified based at least in part on the number of users who access an item after a particular user. Advantageously, by applying weights to the links between the users and the fictitious users, a user who is identified as an early adopter user because of a large number of purchases made by a user may be filtered.

To further clarify how the weighting process may be used, and not to limit the present disclosure, the links of the directed graph can be analogized to a series of water pipes and the nodes can be analogized to water containers. Each time a subsequent user accesses an item, a pipe may be connected to an initial user allowing some amount of water to flow to the water container of the initial user. In such a case, the initial user obtains more water. The more water in the user's container, the more likely the user is an early adopter user. However, as the initial user accesses more items, the link to the fictitious user may be made larger resulting in more water flowing out of the initial user's container to the fictitious user. Thus, the more items accessed by the initial user, the less likely that the initial user is an early adopter user, and the more likely that the user is a bulk purchaser, such as a buyer for a school district or a business. The node associated with the fictitious user may be filtered from a list of ranked nodes after performing a page rank process, or other centrality-based measurement process, to prevent the fictional user from being selected as an early adopter user.

In some cases, a particular user who accesses (e.g., purchases) an item before all other users in a set of users will be associated with a node that has no outgoing links, but may have one or more incoming links from nodes corresponding to users who accessed the item subsequent to the particular user. Alternatively, the particular user may have one outgoing link to the fictional user node. Generally, the directed graph 100 will not include any self-loops as typically, the subsequent user who accesses an item differs from the prior user who accesses the item. However, in some cases, a user may access an item two or more successive times before another user accesses the item. In such cases, the subsequent item accesses may be ignored to present a self-loop from being created in the directed graph 100.

Further, in some embodiments, the directed graph 100 may have reciprocal links between nodes. This may occur if a first user accesses a first item prior to a second user, but the second user accesses a second item prior to the first user. However, if the first and second items are associated with unrelated item categories, the links may be formed in separate directed graphs, which may not be combined. In such cases, reciprocal links may not occur.

Reciprocal links may also occur if a first user accesses an item both before and after a second user. However, in other cases, the second access of the item by the first user may be ignored. In such cases, the reciprocal links may not be formed.

As previously stated, the directed graph 100 enables a system to identify early adopter users. The more incoming links a node has in the directed graph 100, the more likely the user corresponding to the node is to be an early adopter user. Conversely, the more outgoing links, the less likely a user is to be an early adopter user. However, in some cases, such as when a large number of items and/or users are used to create the directed graph 100, a comparison of incoming vs outgoing links may be insufficient to identify early adopter users. In such cases, weights may be applied to the incoming and outgoing links to help identify the early adopter users.

Further, a score may be generated for each node corresponding to a user based at least in part on the incoming links, the outgoing links, the weights on the links, the number of nodes with links that point indirectly to the node, etc. Nodes that point indirectly to a first node can include nodes that point to a second node, which then points to the first node. Thus, in some cases, the node U2 may have a higher score than the node U4 because although both nodes share the same number of incoming and outgoing links, the node U2 has more nodes that point indirectly to it than the node U4.

By ranking each of the nodes of the directed graph 100 by the number of incoming versus outgoing links, early adopter users can be identified. Alternatively, or in addition, by ranking the nodes of the directed graph 100 by a score relating to weights of the links and/or the number of nodes in a chain of nodes subsequent to each node, early adopter users can be identified.

Example Networked Computing Environment

Figure 2:
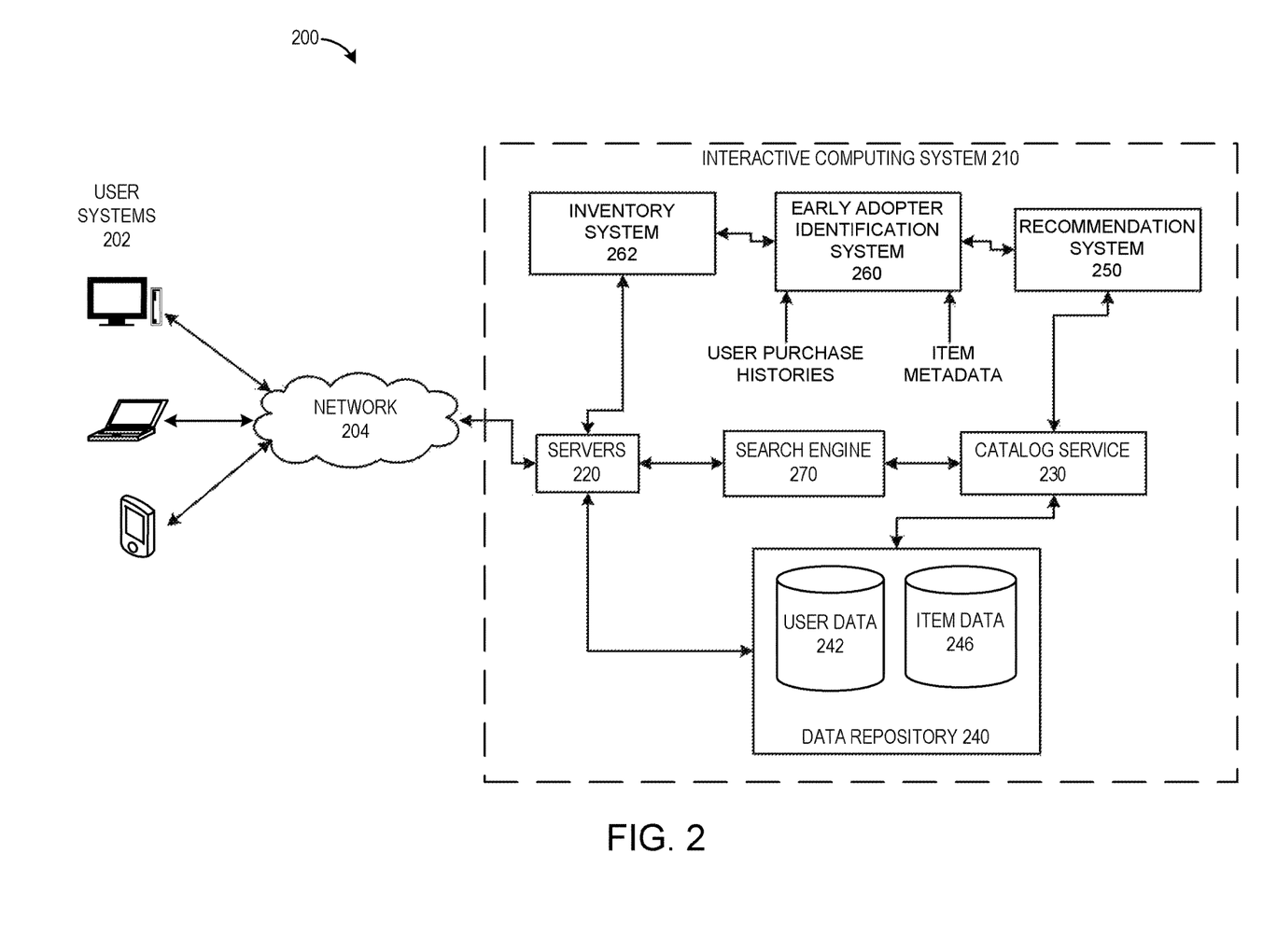
FIG. 2 illustrates an embodiment of a networked computing environment that can implement the features described herein in the context of an example interactive computing system.

FIG. 2 illustrates an embodiment of a networked computing environment 200 that can implement the features described herein in the context of an example interactive computing system 210. The interactive computing system 210 can, in some cases, implement a network application, such as a web application or website, for providing users with access to items. In some embodiments, the interactive computing system 210 may process item access data provided by external network sites or third-party organizations. In some embodiments, the interactive computing system 210 is associated with a network or Internet-based store or retailer. For example, the interactive computing system 210 may be part of an ecommerce site. In some cases, the interactive computing system 210 may be associated with an Internet-based store that is affiliated with a brick-and-mortar store or retailer.

In certain embodiments, the interactive computing system 210 can send to a user system 202 a user interface (e.g., a web page) for presentation via the user system to a user. In response, the interactive computing system 210 can receive data associated with a user's interaction with the user interface from the user system 202. This interaction date may include item access, and update of item access data, a request to run an algorithm, such as an early adopter identification algorithm, etc. Further, in some cases, the interactive computing system 210 can provide a user interface to a user system 202 that is associated with an identified early adopter user. This interface may include, among other things, an indication of why a user is identified as an early adopter or recommendations selected based on the identification of the user as an early adopter or based on actions performed by other users who may be identified as early adopters.

Users may interact with the interactive computing system 210 via one or more user systems 202. The user systems 202 may include hardware and software components for establishing communications over a communication network 204. For example, the user systems 202 may be equipped with networking equipment and network software applications (e.g., a web browser) that facilitate communications via a network (e.g., the Internet) or an intranet. The user systems 202 may have varied local computing resources such as central processing units and architectures, memory, mass storage, graphics processing units, communication network availability and bandwidth, etc. Further, the user systems 202 may include any type of computing system. For example, the user systems 202 may include any type of computing device(s), such as desktops, laptops, video game platforms, television set-top boxes, televisions (e.g., internet TVs), network-enabled kiosks, computerized appliances, wearable devices (e.g., smart watches and glasses with computing functionality), and wireless mobile devices (e.g., smart phones, PDAs, tablets, or the like), to name a few.

The network 204 can include any type of communication network. For example, the network 204 can include one or more of a wide area network (WAN), a local area network (LAN), a cellular network, an ad hoc network, a satellite network, a wired network, a wireless network, etc. Further, in some cases, the network 204 can include the Internet.

The interactive computing system 210 can include a number of systems that facilitate implementing the processes described herein. These systems may be implemented in hardware. For instance, the interactive computing system 210 can include one or more servers 220, which may be implemented in hardware, for receiving and responding to network requests from the user systems 202. However, some of the capabilities of the servers 220 may be implemented in software. The one or more servers 220 can include a variety of different server types including network servers, web servers, application servers, database servers, and combinations of the same, or the like. Although the interactive computing system 210 may include one or more servers 220, the present disclosure is not limited for use with systems that employ a client/server architecture. Any computing architecture that enables users to obtain item access information and to use this information to identify early adopter users may implement the present disclosure.

Further, the interactive computing system 210 may include a search engine 270, which may be implemented in hardware and/or software. The search engine 270 can include any system for searching an electronic catalog. For example, the search engine 270 can search an electronic catalog provided by the catalog service 230. Both the search engine 270 and the catalog service 230 may be in communication with one or more of the servers 220. Users can browse the electronic catalog provided by the catalog service 230 or query the search engine 270 to obtain information about electronic catalog content stored in an item data repository 246.

The electronic catalog content can include information about items available for access or purchase by a user. The items may include any type of item and is not limited in type or form. For example, the items may include physical products, digital products, gifts, electronic currency, and/or services. In one embodiment, the content is arranged in a hierarchical structure having items associated with one or more categories or browse nodes in a hierarchy. The catalog service 230 can provide functionality for users to browse the product hierarchy in addition to searching the catalog via the search engine 270.

In some cases, the hierarchical structure can include a tree-like structure with browse nodes that are internal nodes and with browse nodes that are leaf nodes. The internal nodes generally include one or more child or descendent nodes and the leaf nodes generally do not include child nodes. The internal nodes may be associated with an item category or classification, which can include sub-classifications. The sub-classifications may represent additional internal nodes or leaf nodes. The leaf nodes may be associated with an item category or classification that does not include sub-classifications. In some implementations, the internal nodes are associated with item classifications and sub-classifications, but not items, and the leaf nodes are associated with the items. In other implementations, both the internal and leaf nodes may be associated with items.

Users can select or access an item represented in the hierarchy or in a list of search results to see more details about the item. In response to a user's item selection, the server 220 can provide to a user system 202 a catalog page (sometimes called an item or product detail page) that includes details about the selected item. These details may include an item title, item specifications, manufacturer-provided content, user reviews, and the like.

The interactive computing system 210 also includes a recommendation system 250. The recommendation system 250 can generally include any system for recommending one or more items to a user associated with the user systems 202. The recommendation system 250 may recommend an item in response to a request from a user or from an administrator associated with the interactive computing system 210. Alternatively, or in addition, the recommendation system 250 may recommend an item automatically without receiving a user request. For example, the recommendation system 250 may recommend items in response to a user accessing an item detail page for another item. In some cases, the recommendation system 250 may recommend an item to a user in response to a passage of time since a previous purchase by the user.

In some embodiments, the recommendation system 250 may identify one or more items to recommend to a user based at least in part on items accessed by other users who have been identified as early adopter users. For example, if a threshold number of early adopter users purchase a particular new video game, the video game may be selected for recommendation to the user. In some cases, the video game may be selected for recommendation to users who have previously purchased video games, but not to users who do not have a history of purchasing video games or who purchase video games infrequently.

The interactive computing system 210 further includes an early adopter identification system 260. The early adopter identification system 260 can generally include any system for identifying early adopter users from among a set of users. As illustrated in FIG. 2, the early adopter identification system 260 may receive or access user purchase history data and item metadata to facilitate identifying early adopter users. The user purchase histories may include information relating to item purchases and/or item accesses for one or more users including the types of items accessed by the one or more users and when the one or more users accessed the items. The item metadata may include information relating to the availability of items as well as the related items in an item category. Further, the item metadata may include information relating to when an item was added to an electronic catalog of the catalog service 230. Both the user purchase histories and the item metadata may be accessed from one or more data repositories 240.

The early adopter identification system 260 may select the set of users based on item accesses of items from one or more particular item categories. For instance, the early adopter identification system 260 may identify some or all users who access items from item categories corresponding to one or more of science fiction novels, from fantasy novels, science fiction movies, and fantasy movies. The early adopter identification system 260 may create a directed graph representing each of the users as a node in the directed graph. Further, the directed graph may be formed in a reverse temporal order such that nodes corresponding to users who access an item after a particular user have links that point, directly or indirectly, to a node corresponding to the particular user who accessed the item earlier than the other users.

In some embodiments, the early adopter identification system 260 can perform a page rank type process or other process to identify nodes within the directed graph that have a threshold percentage or number of incoming links. For example, referring back to FIG. 1, if the threshold number is three links, the page rank type process would identify the node U1 and the fictitious user node. In some cases, the node associated with the fictitious user would be filtered from the results of the page rank type process because the node is associated with a fictional user or is not associated with a real person or organization. If on the other hand the threshold number were two links, the page rank type process would also identify U94, U7, and U3. These identified users may be designated as early adopter users and may be monitored to determine the level of interest in an item newly added to an electronic catalog of the catalog service 230 of FIG. 2. If the level of interest satisfies a threshold, then the recommendation system may recommend the item to other users.

Further, an inventory system 262 may use the level of interest in an item to determine whether to maintain an amount of the item in an inventory. Further, the inventory system 262 may use the level of interest to determine the quantity of the item to maintain in the inventory. The inventory system 262 may generally include any system for managing the inventory of items for an organization associated with the interactive computing system 210 or an organization that uses services supplied by the interactive computing system 210.

In some embodiments, the early adopter identification system 260 may be a separate or discrete system that is distinct from the interactive computing system 210. In some such cases, the early adopter identification system 260 may provide a separate early adopter identification service that can identify users who are early adopters on behalf of another entity. For instance, an entity associated with the interface computing system 210 may enable the early adopter identification system 260, which may be associated with a different entity, to access user information and item access information, for example, from the data repositories 240, enabling the early adopter identification system 260 to identify early adopter users for the interactive computing system 210, or an entity associated therewith.

In addition to the aforementioned systems, the interactive computing system 210 may include a data repository system 240. The data repository system 240 can generally include any repository, database, or information storage system that can store information associated with items and users. This information can include any type of data including: item descriptions, item attributes, account information, customer reviews, item tags, or the like. Further, this information can include relationships between items, between users, and between items and users.

As illustrated in FIG. 2, the data repository 240 can include a user data repository 242 and an item data repository 246. Although illustrated as separate repositories, in some cases the repositories may be combined. Further, in some cases, the repositories may be implemented on one or multiple computing systems.

The user data repository 242 can store information associated with a user including account information, user purchase information, user demographic data, item view information, user searches, identity of items owned by a user (e.g., purchased or obtained as a gift), and the like. Further, the user data repository 242 can store information relating to whether a user is an early adopter user. This information can include an identity of item categories for which the user may be an early adopter user. In some cases, the user data repository 242 may store relationships between users based on similarities in item purchase profiles.

The item data repository 246 can store any information associated with an item. For example, the item data repository 246 can store item descriptions, customer reviews, item tags, manufacturer comments, etc. Further, the item data repository 246 can store item categorization information for an item.

Example Early Adopter Identification Process

Figure 3:
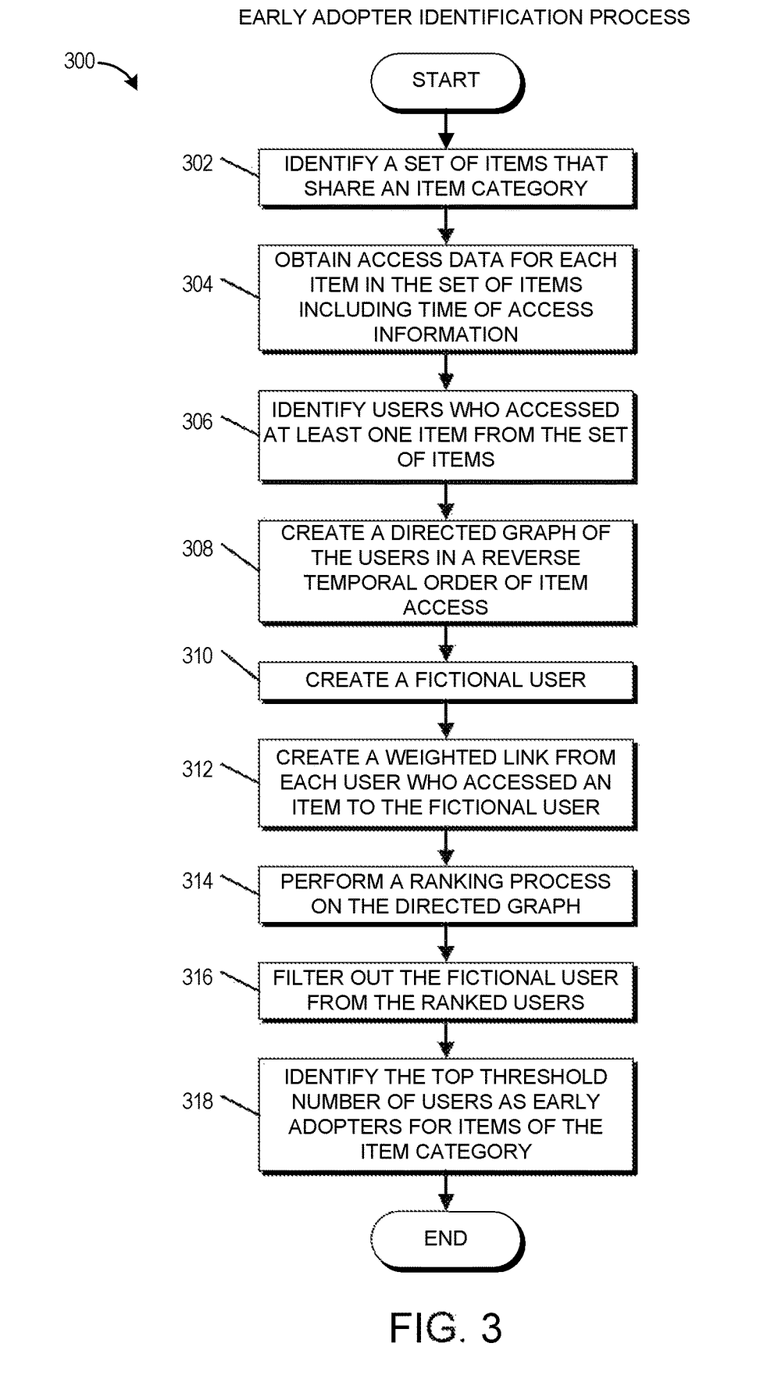
FIG. 3 illustrates a flow diagram for an embodiment of an early adopter identification process.

FIG. 3 illustrates a flow diagram for an embodiment of an early adopter identification process 300. The process 300 can be implemented by any system that can use item access information to identify users who are early adopters. For example, the process 300, in whole or in part, can be implemented by an early adopter identification system 260, a catalog service 230, an interactive computing system 210, or a recommendation system 250, among others. Although any number of systems, in whole or in part, can implement the process 300, to simplify discussion, the process 300 will be described with respect to particular systems.

The process 300 may be performed for an item, for a set of items associated with an item category, or for a set of items associated with multiple item categories. Further, the process 300 may be performed across a single item category or across multiple item categories. In addition, the process 300, or portions thereof, may be performed on a continuous or intermittent basis.

The process 300 begins at block 302 where, for example, the early adopter identification system 260 identifies a set of items that share an item category, or associated with the item category. In some cases, the set of items may consist of a single item. However, generally, the set of items includes multiple items that are classified in the item category. Moreover, in some cases, at least some items from the set of items may be associated with another item category. Furthermore, at least some items from the set of items may be associated with multiple item categories.

At block 304, the early adopter identification system 260 obtains access data for each item in the set of items. This access data generally includes time of access information. In other words, the access data may identify users who accessed one or more items in the set of items and a time associated with the item access. In some cases, the time associated with the item access may be a relative time. For example, the access data may identify the users who accessed an item after a particular user and the users who accessed the item before a particular user. Alternatively, or in addition, the time associated with the item access may be an absolute time identifying the specific time during which a user accessed an item from the set of items.

Furthermore, the access data may identify users who purchased an item, viewed the item, consumed the item, rented the item, accessed an item detail page associated with the item, or performed any other type of access associated with the item. (In some embodiments only a specific type of action, such as purchases, is considered.) In addition, the access data may be associated with a particular time period or for a threshold time period. In other cases, the access data may be obtained continuously or intermittently over a non-finite time period. In some embodiments, access data for an item within the set of items may be received or updated at the block 304 each time the item is accessed or after a threshold number of accesses since the previous time the access data was obtained.

The early adopter identification system 260 may obtain the access data for one or more items in the set of items by accessing a repository, such as the item data repository 246. In some embodiments, the early adopter identification system 260 may obtain access data separately for each item and/or separately for each item category.

At block 306, the early adopter identification system 260 identifies users who accessed at least one item from the set of items. In some cases, the early adopter identification system 260 may separate the users based on the type of access each user performed with respect to an item from the set of items. For example, in some cases, the early adopter identification system 260 may filter out users from the set of users who viewed an item, but did not purchase the item. As a second example, the early adopter identification system 260 may filter out users from the set of users who purchased an item as a gift instead of for themselves.

In some embodiments, the identified users may be filtered based on one or more user characteristics or demographics. For example, the process 300 can be used to identify early adopters in a particular geographic region. In some cases, a user may not be universally an early adopter, but may be an early adopter for a particular region. This may occur, for example, when trends in one geographic region (e.g., the West Coast of the United States) are delayed compared to another geographic region (e.g., the East Coast of the United States). Advantageously, by filtering the users based on geographic region, a user who might not be identified as an early adopter can be identified as an early adopter in the user's geographic region. Other non-limiting examples of characteristics or demographics that can be used to filter the identified users can include gender, age, income, family type (e.g., single, married, family with children, family with young children, family with older children, etc.), and the like. Although the filtering is described with respect to the block 306, it should be understood that filtering may occur at other stages of the process 300, such as with respect to the block 318 described below.

At block 308, the early adopter identification system 260 creates a directed graph of the users identified at the block 306. This directed graph may be performed in a reverse temporal order as determined based on the item access information obtained at the block 304. The early adopter identification system 260 may create the directed graph using a variety of graphing techniques. For example, each of the users identified at the block 306 may be associated with a node in the directed graph. Further, for each item accessed by a particular user a link may be formed between the node in the directed graph corresponding to the particular user and another node corresponding to another user who accessed the item prior to the particular user. This link may be oriented such that it points away from the node corresponding to the particular user and towards the node corresponding to the user who accessed the item prior to the particular user.

Generally, a link in the directed graph is between a node corresponding to a particular user and a node corresponding to the user who accessed the item most recently prior to the particular user. However, the present disclosure is not limited as such. In some cases, a link may be formed between a node corresponding to a particular user and multiple other nodes corresponding to multiple users to each accessed the item prior to the particular user. Further, in some cases, more than one user may access an item simultaneously or within a threshold time period from each other. In some such cases, a link may be formed between a node corresponding to a particular user in the nodes corresponding to each of the multiple users who accessed the item substantially in parallel and prior to the particular user. Alternatively, the link may be formed between the particular user and one or less than all of the multiple users who accessed the item at substantially the same time and prior to the particular user. The selected users from the multiple users may be selected at random or using a particular selection algorithm.

Although the directed graph is generally described as being created based on access information for each item from the set of items, in some cases the directed graph may be a composite directed graph created from several directed graphs. In some such cases, the directed graph may be created for each item from the set of items based on access information for the item. The composite directed graph for the set of items may be created by combining each of the separate directed graphs for the individual items from the set of items.

At block 310, the early adopter identification system 260 creates a fictional user. This fictional user can correspond to a node in the directed graph that is not associated with any user. In some embodiments, the block 310 may be optional or omitted.

At block 312, the early adopter identification system 260 creates a weighted link from each node corresponding to a user who accessed an item to the node corresponding to the fictional user. The weight of the weighted link between a node corresponding to a particular user and the node corresponding to the fictional user may be based on the number of links pointing towards the node corresponding to the particular user. Each time an additional link is formed pointing towards the node corresponding to the particular user, the weight between the node and the node corresponding to the fictional user may be modified. In general, the early adopter identification system 260 weights a link between a particular node and the node of the fictional user more heavily as the number of incoming links to the particular node increases.

In some cases, a particular user may be misidentified as an early adopter user. This may occur because the particular user may access a larger number of items than other users who are included in the item access information. As such, a node corresponding to the particular user may have a large number of incoming links due more to the number of item accesses in the item category rather than because the user tends to be an early adopter. For instance, a user with an obsession for film noir may tend to purchase a large number of films categorized as film noir, but this user may or may not be an early adopter. However, because the user purchases many films in the film noir category, a node corresponding to the user may develop a large number of incoming links. This user may not make a good early adopter user because purchases by this user may not be a good indication of whether a particular film noir item will be popular with users. Instead, the user may purchase the film due more to the user's strong interest in film noir obsession rather than the quality or likely popularity of the film.

In some such embodiments, by weighting the links between nodes corresponding to users and the node corresponding to the fictional user more heavily each time an item is accessed, users who tend to access a large number of items compared to other users may be penalized. Advantageously, by penalizing users who access large numbers of items, the probability of the user being misidentified as an early adopter user is reduced. In some embodiments, the block 312 may be optional or omitted.

The early adopter identification system 260 performs a ranking process on the directed graph at block 314. For each node in the directed graph, a score may be obtained for the node using the ranking process. Typically, the node with the highest score will be the node corresponding to the fictional user. Thus, the node with the highest score may be ignored or filtered out from the nodes corresponding to the other users at the block 316. The remaining nodes may be ranked according to the score obtained using the ranking process. Typically, but not necessarily, nodes with more incoming links will be ranked higher than nodes with less incoming links. In some cases, generating a score or a ranking score for a node may include scoring the node based on both the number of incoming links and the number of incoming links to the nodes that are linked to the scored node. Moreover, in some cases, the score may be based at least in part on every node that is linked to a node either directly or indirectly. Thus, a first node that has three, four, five, ten, or twenty nodes between it and a second node may still impact the score of the second node. Alternatively, in some cases, a node that has more than a threshold number of nodes between it and a second node may not be counted in the score of the second node and/or may be weighted to a degree such that the node has relatively little impact on the weight of the second node compared to nodes that are linked directly.

Further, in some cases, due to penalties applied to the links of users who tend to access a large number of items, users who access many items may receive a lower score preventing such users from being identified as early adopter users. The ranking process may be based at least in part on a number of centrality-based processes and/or Markov chain processes. For example, the ranking process may be a page-rank like process, an eigenvector centrality process, a degree centrality process, a closeness centrality process, a betweenness centrality process, a Katz centrality process, a percolation centrality process, and/or a cross-clique centrality process.

At block 318, the early adopter identification system 260 identifies the top threshold number or percentage of users as early adopter users for items of the item category reference with respect to the block 302. The top threshold number or percentage of users includes the users who correspond to the nodes with scores from the page rank type process that satisfy a threshold number or percentage. In some cases, a user identified as an early adopter user at the block 318 may be identified as an early adopter user for multiple item categories. In other cases, the user may be identified as an early adopter user for a single item category. The threshold used to determine whether a user is an early adopter user may vary based on one or more of the item category, the sales rate for the item category, the average price of items in the item category, the frequency at which users replace items from the item category with newer models or a replacement instance, and any other factor that may, in some cases, be item or item category specific. In some cases, the threshold number of users may be filtered by one or more user characteristics or demographics as previously described above.

In some embodiments, the early adopter users are identified as users who access an item within a threshold release window. This threshold release window may vary based on the item category and/or the cost of the item, among other characteristics. In some cases, a user may be identified as an early adopter user if the user satisfies one or more of a score threshold for a score calculated using a page rank type process and a threshold percentage of incoming links for a node corresponding to the user and/or accesses a threshold number (which may be one or more) of items from the set of items within the threshold release window. In other cases, to be identified as an early adopter user, the user must satisfy a score threshold for a score calculated using a page rank type process, a threshold percentage of incoming links for a node corresponding to the user, and access a threshold number of items from the set of items within a threshold release window.

In certain embodiments, the links between each of the nodes may be weighted. The weight on each link may be determined based on a relationship between the user's corresponding to the nodes at either end of the link. For example, the weight of a link between two users may be based on similarities in demographic information between the two users, similarities in purchase history between the two users, the number of purchases made by each of the two users, and the like. Equation 1 below is one example of a weighting algorithm that may be used to weight the links based on a cosine distance between two users, $U_i$ and $U_j$, where 'i' refers to the user corresponding to the node with the incoming link and 'j' refers to the user corresponding to the node with the outgoing link. In other words, the link points from node j to node i.

$$W_{ij} = \alpha \Sigma_{item\ access} \cos(U_i, U_j) \quad (1)$$

The cosine distance between $U_i$ and $U_j$ may be based on similarities of particular characteristics and/or demographics between the two users. For example, the cosine distance may be based on the gender(s) of the users, the geographic region(s) where the users live, the item categories each of the users accesses a threshold amount, whether the users are early adopter users for another item category, etc. Further, the cosine distance may be calculated per item accessed and the weight calculated may be based on a summation of the cosine distance between the users for the items accessed times a constant, $\alpha$. It should be understood that as items are accessed, the cosine distance between the users $U_i$ and $U_j$ may change. For example, the access by one of the users of a particular item may change the level of similarity between the two users. As a second example, one of the users may change geographic regions thereby altering the cosine distance between the users for subsequent item accesses.

Advantageously, by using the cosine difference between users to weight links, an access of an item by two users who have different profiles can be discounted. In contrast, an item access by two users who have similar profiles can be weighted more heavily. For instance, a link between two users who buy a refrigerator, but have different interests may be discounted. However, a link between two users who purchase a mystery novel and have a relatively high degree of similarity of interests may be weighted higher compared to two users who purchase a mystery novel, but have a low degree of similarity of interests. Two users may access the same item with a low degree of similarity when, for example, one users accesses the item as a gift or for an unusual reason (e.g., the author is a sibling).

In some embodiments, the weight associated with a link between two users may be based on when the users accessed an item in relation to when the item was added to an electronic catalog. For example, if both users accessed the item the same day that the item was added to the electronic catalog, the link between the users may be weighted more than if one or both of the users accessed the item a year after the item was added to the electronic catalog. Further, in some implementations, the weight may be based at least in part on the price of an item or an alternative measure that can serve as a proxy for the expected profit resulting from the sale of an item. Thus, in some cases, links between nodes of users created due to a sale of a more profitable item may be weighted more than links created due to a sale of a less profitable item.

In some embodiments, the directed graph, or links in the directed graph may represent actions other than or in addition to item purchases. For example, a link may be formed between two users based on when the two users listened to a particular song, viewed a particular video, played a particular video game, viewed information for a particular item, etc. In some such cases, the weight applied to a particular link may vary based at least in part on the type of action that resulted in the link generation. For example, a link generated by an item view may be weighted less than a link generated as a result of an item purchase. Further, in some cases, multiple links may be created between a pair of users based on the type of action performed. For instance, one link may be created for viewing a particular video, and another link may be created for subsequently purchasing the video. Alternatively, the weight may be modified on a link based on follow-up actions. For instance, an initial weight may be applied to a link based on an item view. The weight may be increased if the item is subsequently purchased.

In certain embodiments, by weighting links between users, the scores obtained by performing the page rank type process may be modified. As such, in some cases, a user with less links may be identified as an early adopter user while a user with more links may not be identified as an early adopter user.

In certain embodiments, the process 300 may be performed intermittently or continuously over time. As such, the weights applied to links between users may change over time due to additional item accesses that may occur between performances of the weighting process. In some such cases, the weight may be recalculated using the complete item access information for each item and user. However, in other cases, the previously calculated weight is modified by adjusting the previously calculated weight based on item accesses that occurred subsequent to the prior calculation of a weight for a particular link. In such cases, if no additional item accesses exist among a particular set of users, the weights calculated for the links between the particular set of users may remain unmodified and an updated calculation of the weights may be omitted for the particular set of users.

In some embodiments, the process 300 may be used to generate a score for each user of a set of users that identifies the extent to which each of the users is an early adopter user. Thus, in some cases, in addition to or as an alternative to determining whether a user is an early adopter user, the process 300 can identify to what extent the user is an early adopter user. A user may be selected based on an item category and the score associated with the user as an early adopter user. Thus, for some item categories the user may be an early adopter user and for other item categories the user may not be considered an early adopter user.

Pseudo Code for Example Early Adopter Identification Process

Figure 4:
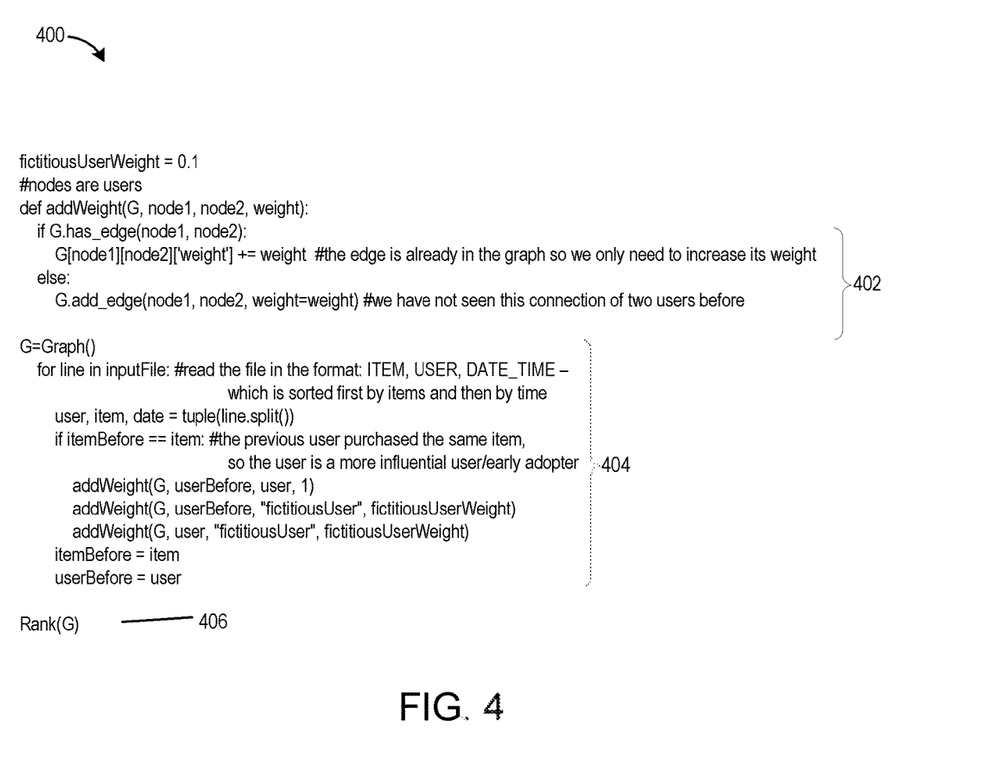
FIG. 4 illustrates pseudo code for an embodiment of an early adopter identification process.

FIG. 4 illustrates pseudo code 400 for an embodiment of an early adopter identification process. The pseudo code 400 can be divided into three main sections, 402, 404, and 406. The section 402 of the pseudo code 400 uses a weight algorithm to modify a weight between two nodes corresponding to two users. Further, the section 402 determines whether a new edge or link is to be created between two users whose nodes were not previously linked.

In section 404 of the pseudo code 400, a directed graph of nodes corresponding to users is created. Further, access data is analyzed to determine whether a previous user purchased the same item as another particular user. If so, the weight algorithm described with respect to the section 402 is accessed to modify the weight of the link between two users as well as the weight of links between each of the two users and a node associated with a fictitious user that is not associated with a particular user. Section 406 of the pseudo code 400 performs a page rank type process or method on the directed graph created in section 404.

The pseudo code 400 is one example of an early adopter identification process using directed graphs. However, it should be understood that other algorithms are possible. For example, in some cases, links between nodes corresponding to users remain unweighted or have a uniform weight that is not modified in response to item accesses. However, in some such cases, the weight between a node corresponding to a user and the fictional user node is adjusted based at least in part on the item accesses of the users.

Example Recommendation and Inventory Maintenance Process

Figure 5:
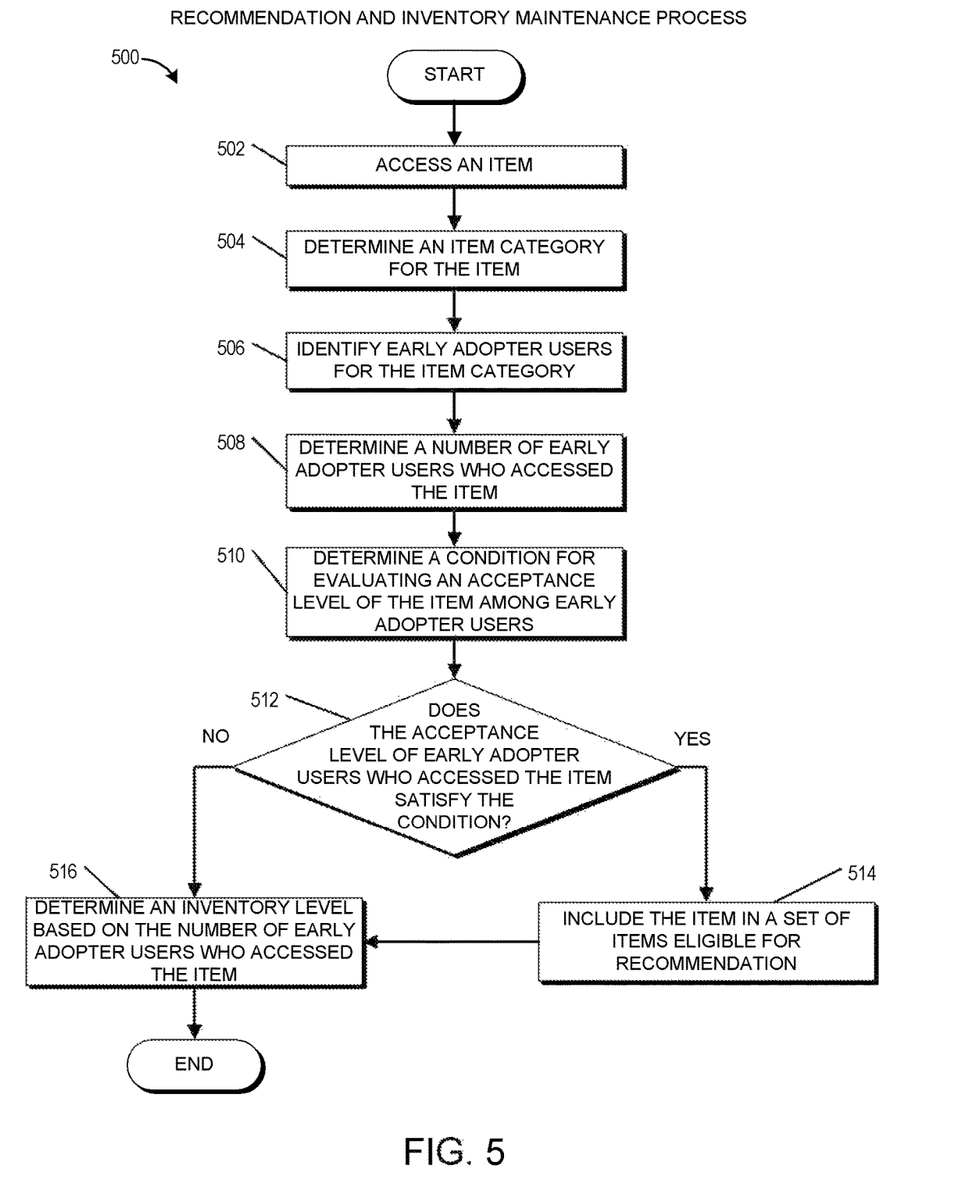
FIG. 5 illustrates a flow diagram for an embodiment of a recommendation and inventory maintenance process.

FIG. 5 illustrates a flow diagram for an embodiment of a recommendation and inventory maintenance process 500. The process 500 can be implemented by any system that can use early adopter users to facilitate determining an item to recommend and/or to an inventory level to maintain for the item. For example, the process 500, in whole or in part, can be implemented by an early adopter identification system 260, a catalog service 230, an interactive computing system 210, or recommendation system 250, or an inventory system 262, among others. Although any number of systems, in whole or in part, can implement the process 500, to simplify discussion, the process 500 will be described with respect to particular systems.

The process 500 begins at block 502 where, for example, the interactive computing system 210 accesses an item. This item may be an item that was added to an electronic catalog of the catalog service 230 within a threshold time period. Further, this item may be an item that was excluded from the set of items identified at the block 302 as part of the process 300. Alternatively, the item accessed at the block 502 may be an item included in the set of items of the block 302. In some cases, the item of the block 502 may not be included in the initial set of items accessed at the block 302, but may be used to update the directed graph created using the process 300 and/or the weights applied to links of the directed graph created using the process 300.

At block 504, the interactive computing system 210 determines the item category for the item. In some cases, the block 504 may include determining multiple item categories for the item. Further, although a particular item may be associated with multiple item categories, in some cases, the interactive computing system 210 selects one or more item categories associated with the item, but less than all of the item categories associated with the item.

At block 506, the early adopter identification system 260 identifies one or more early adopter users for the item category determined at the block 504. In some cases, the early adopter identification system 260 identifies early adopter users for multiple item categories associated with the item accessed at the block 502. Although not limited as such, in some cases, the block 506 may include performing some or all of the process 300 to facilitate identifying the early adopter users.

The early adopter identification system 260 determines, at block 508, a number of early adopter users from the users identified at the block 506 who accessed the item described with respect to the block 502. Alternatively, or in addition, the block 508 may include determining the percentage or rate of early adopter users who accessed the item. Furthermore, in some cases, the block 508 may include determining the number or percentage of early adopter users who accessed the item within a threshold time period of the item being included in the electronic catalog of the catalog service 230.

At block 510, the recommendation system determines a condition for evaluating an acceptance level of the item among early adopter users. In some cases, the condition may be a threshold number of percentage of early adopter users. In other cases, the condition may be normalized based at least in part on specific characteristics or demographics of a subset of the early adopter users. Alternatively, or in addition, the early adopter users may be filtered based on the specific characteristics or demographics of the early adopter users. For example, the early adopter users may be filtered to identify early adopter users within a specific geographic region. The threshold percentage of early adopter users may be selected based on the filtered set of early adopter users and/or the condition used to filter the early adopter users.

In some embodiments, the condition may include a relative popularity of the item between early adopter users and users who have not been identified as early adopter users. For example, the condition may include a percentage difference between the adopter of the item by early adopter users and non-early adopter users. In some cases, the condition is multi-part. For example, the condition may include a threshold for the number or percentage of early adopter users that access the item and another threshold for the difference in adoption rate between early adopter users and non-early adopter users. Advantageously, by comparing the adoption rate between early adopter users and non-early adopter users, an item that is not only popular among early adopter users, but is also popular among non-early adopter users can be omitted from items identified for recommendation. In other words, a recommendation for an item that is universally popular may be less effective than an item that is popular among early adopter users, but which may not yet be popular among users generally.

At decision block 512, the recommendation system 250 can determine whether the acceptance level of early adopter users who accessed the item satisfies the condition identified at the block 510. In some cases, the condition may vary based at least in part on the item category associated with the item. Further, in some cases, the condition may vary based at least in part on when the item was added to an electronic catalog of the catalog service 230. For example, an item added to the electronic catalog more recently may have a lower threshold than for an item added less recently to the electronic catalog. In other words, in some cases, the longer an item is included in an electronic catalog the greater the number or percentage of early adopter users who must access the item before the item is eligible for recommendation.

If it is determined at the decision block 512 that the acceptance level of early adopter users who accessed the item satisfies the condition, the recommendation system 250 includes the item in a set of items eligible for recommendation at block 514. In some cases, the block 514 includes adding the item to a set of items eligible for recommendation to a particular set of users, such as users who have a threshold degree of similarity to the early adopter users. It should be understood that a variety of recommendation processes may be used to determine whether to recommend an item, or whether to recommend an item to a particular set of users in conjunction with the process 500. In other words, although an item is added to a set of items eligible for recommendation using the process 500, the item may or may not be recommended to a particular user based on one or more additional recommendation processes that may be performed in conjunction with or independently from the process 500. For instance, although a particular item is included in a set of eligible items for recommendation, the item may not be recommended to a particular user if a user-to-user similarity process or an item-to-item similarity process does not identify the item for recommendation.

In some embodiments, including the item in a set of items eligible for recommendation may include identifying one or more messages to provide a user who is recommended an item. For example, a message may be displayed to a user indicating that an item is recommended because the item is gaining in popularity generally, or in the geographic region where the user resides. As a second example, the message may indicate that the item is popular with users of the same gender or who share similar interests. As a third example, the message may indicate that the item has been bought or accessed by a number of early adopter users. The message may be presented on an item-detail page, in an email, as a text, or via any other process for providing a message to a user.

In certain embodiments, if the number of early adopter users who access the item of the block 502 does not satisfy a threshold, the item may be excluded from a set of items eligible for recommendation to a certain set of users. However, in some cases, the item may still be eligible for recommendation to other users. For example, suppose that a particular item is associated with item categories X and Y. Further, suppose that less than a threshold number of early adopter users associated with item category X accessed the item. In some such cases, the item may not be recommended to users who have a threshold similarity to the early adopter users or who have been identified as having an interest in items corresponding to the item category X. However, in some cases, the item may still be recommended for eligible for recommendation to users who have been identified as having an interest in items corresponding to the item category Y.

In some embodiments, whether or not a threshold percentage of early adopter users access an item may be factored into a recommendation score for the item. One or more recommendation algorithms may use the score to determine whether the item is to be recommended. Thus, in certain cases, an item with a low percentage of early adopter users may still be recommended to a user if other recommendation factors are satisfied. Further, in some cases, the percentage of early adopter users who access an item may be a factor used to generate a recommendation score for an item. In some such cases, the decision block 510 may be optional or omitted.

At block 516, the inventory system 262 determines an inventory level to maintain for the item based at least in part on the number or percentage of early adopter users who accessed the item. Further, in some cases, the block 516 may include analyzing an item popularity trend to facilitate determining an inventory level to maintain for the item. Thus, in some cases, the inventory level may change over time for the item. As illustrated in FIG. 5, the block 516 may be performed regardless of whether the number or percentage of early adopter users who accessed the item satisfies the threshold. In some cases, the inventory level determined at the block 516 is a graduated inventory level based on the number or percentage of early adopter users who accessed the item. Moreover, the inventory system 262 may modify the inventory level for an item as the number of early adopter users who access an item increases. Similarly, if the rate of users who accessed the item over a time period fluctuates, so may the inventory level for the item maintained by the inventory system 262. Thus, if the rate of users who access the item decreases over time, so may the inventory level for the item maintained by the inventory system 262. In certain embodiments, the inventory system 262 may automatically place a onetime order or an intermittent order (e.g., monthly) for an item or a quantity of the item to maintain an inventory level for the item. This inventory level may be determined based at least in part on performing the process 500. As the determined inventory level changes over time, so may the intermittent orders for the item. Further, the inventory system 262 may initiate a return of excess inventory for an item to a supplier based on a detected trend indicating a reduction in popularity for the item.

In certain embodiments, the process 500 may be performed to determine an inventory level to maintain for an item or whether to recommend an item. In other words, in some embodiments, one or more of the blocks 510, 512, 514, and 516 may be omitted or optional. However, in other cases as described above, the process 500 may be performed to determine both an inventory level to maintain for the item as well as whether to include the item in a set of items eligible for recommendation.

In some embodiments, the process 500 may be used to determine the popularity or likely popularity of an item based on the item accesses. For instance, the block 508 may include determining the number or percentage of users who accessed the item that are early adopter users. If it is determined that a low number of users who accessed the item are early adopter users, it may be determined that the item is unlikely to be popular. Identifying the percentage of users that access an item who are early adopter users can be advantageous in distinguishing between a high number of initial sales due to item popularity versus a high number of initial sales due to family and friend support. For example, a novel with initial sales of 500 copies may indicate that the novel is likely to be popular if a high percentage of the 500 copies were purchased by users identified as early adopter users. In contrast, if a high percentage of the 500 copies were purchased by non-early adopter users, the initial sales may indicate that the novel is unlikely to be popular and that the initial copies may have been purchased by the author's friends and family. Based at least in part on a determination of the percentage of initial that sales are to early adopter users versus non-early adopter users, an inventory level for the item can be adjusted. Thus, inventory levels for items with an equal number of accesses may differ based on the type of users who accessed the items (e.g., early adopter users or non-early adopter users). Similarly, whether or not an item is added to a list of items available for recommendation may be based at least in part on the percentage of users who accessed the item that are early adopter users.

In some embodiments, the process 500 may be used to recommend items or services to early adopters. For example, the block 514 may include identifying new items of an item category to recommend to the early adopters. Further, one or more services may be recommended or offered to early adopters to help maintain their status as early adopters and/or to encourage the early adopters to continue accessing items from an electronic catalog provided by the catalog service 230. For example, a free shipping service, or frequent purchase discount service may be offered to user that are identified as early adopter users. Further, invitations and/or incentives to recommend items may be provided to early adopter users to help bootstrap or otherwise increase customer reviews for new items.

In some implementations, the popularity of items among early adopters can be used for locating inventory. For example, if a threshold percentage of early adopters in one geographic region are purchasing an item, while less than the threshold percentage of early adopters in another geographic region are purchasing the item, a greater percentage of inventory for the item may be located or stored at a warehouse in the first geographic region than the second geographic region. As another example, if a threshold percentage of early adopter users in one network-region, which may or may not correspond to a geographic region, are accessing a particular piece of streaming content, a greater number of cache servers may be assigned to cache the particular piece of streaming content, thereby enabling improved streaming and reducing bandwidth usage by maintaining a greater number of cached copies of the streaming content within the network-region.

Moreover, the identification of early adopter users and the determination of the popularity of items, services, or resources among early adopter users can be used to balance the deployment of a variety of resources. For example, the information obtained by observing early adopter users can be used to deploy delivery vehicles, to design incentive for new users or non-early adopter users, to for locating autonomous vehicles, for locating ride-sharing vehicles or taxis, for installing or making available computing resources in a program execution service, etc.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
as implemented by one or more computing devices configured with specific computer-executable instructions,
identifying a set of items associated with an item category from a set of item categories;
accessing purchase information for the set of items, wherein the purchase information includes purchase time information identifying when an instance of an item from the set of items was purchased;
for individual items in the set of items:
identifying users who purchased the item; and
creating a computer representation of a unidirectional directed graph of the users who purchased the item based at least in part on the purchase time information, the purchase time information including a relative temporal ordering of one or more item accesses by the users, wherein a first node associated with a first user who purchased the item after a second user is connected with a directed link to a second node associated with the second user, and wherein the directed link points from the first node to the second node thereby configuring the computer representation of the unidirectional directed graph in a reverse temporal order based at least in part on the purchase time information for the item;
creating a computer representation of a composite directed graph based on the computer representation of the unidirectional directed graph for individual items in the set of items;
performing a graph-based centrality measurement process on the computer representation of the composite directed graph to generate a measure of an extent to which users from a set of users are early adopter users;
identifying one or more users as early adopter users based at least in part on the measure of the extent to which users from the set of users are early adopter users, wherein the early adopter users comprise users who purchase items within a threshold release window;
determining based at least in part on the composite directed graph that at least a threshold amount of the early adopter users accessed a digital item that is consumed via streaming; and
adjusting a number of cache servers configured to cache the digital item based at least in part on the determination that at least the threshold amount of the early adopter users accessed the digital item.

2. The computer-implemented method of claim 1, further comprising:
receiving an indication of an item purchase for an instance of a first item from the set of items by a user; and
updating the computer representation of the composite directed graph to incorporate a node associated with the user into the computer representation of the composite directed graph.

3. The computer-implemented method of claim 1, further comprising:
adding an unassigned node to the computer representation of the composite directed graph, the unassigned node not associated with a user; and
creating a link from individual nodes associated with a user in the computer representation of the composite directed graph to the unassigned node.

4. The computer-implemented method of claim 3, wherein the link from individual nodes to the unassigned node is weighted based at least in part on a number of other nodes linked to the node.

5. The computer-implemented method of claim 4, wherein the number of other nodes linked to the node includes nodes indirectly linked to the node.

6. The computer-implemented method of claim 1, further comprising:
receiving an identity of a new item associated with the item category;
determining a number of users from the early adopter users who purchased the new item within a threshold time period; and
in response to the number of users from the early adopter users satisfying a purchase threshold, including the new item in a list of recommended items.

7. The computer-implemented method of claim 1, further comprising:
receiving an identity of a new item associated with the item category;
determining a number of users from the early adopter users who purchased the new item within a threshold time period; and
maintaining an inventory amount of the new item based at least in part on the number of users from the early adopter users who purchased the new item within the threshold time period.

8. A system comprising:
an electronic data store configured to store item access information; and
an interactive computing system in communication with the electronic data store and configured to at least:
identify a set of items associated with an item category from a set of item categories;
access the item access information for the set of items, wherein the item access information includes access time information identifying when an item from the set of items was accessed;
for individual items in the set of items:

identify users who accessed the item; and create a unidirectional directed graph of the users who accessed the item based at least in part on the time access information, the time access information including a relative temporal ordering of item access by the users, wherein the unidirectional directed graph is configured in a reverse temporal order based at least in part on the access time information for the item;

create a composite directed graph based on the unidirectional directed graph for individual items in the set of items;

perform a graph-based measurement process on the users with corresponding nodes included in the composite directed graph based at least partly on a number of incoming links to the corresponding nodes to obtain an ordered list of users;

identify a set of users from the ordered list of users as early adopter users based on an early adopter threshold; and determine based at least in part on the composite directed graph that at least a threshold amount of the early adopter users accessed a digital item that is consumed via streaming; and adjust a number of cache servers configured to cache the digital item based at least in part on the determination that at least the threshold amount of the early adopter users accessed the digital item.

9. The system of claim 8, wherein the early adopter threshold is based at least partly on the item category.

10. The system of claim 8, wherein the early adopter threshold varies based at least partly on a sales rate for the item category.

11. The system of claim 8, wherein the interactive computing system is further configured to at least:

add a fictional user associated with a fictional node to the composite directed graph; and create a link from individual nodes associated with a user in the composite directed graph to the fictional node.

12. The system of claim 11, wherein the fictional user is included in the ordered list of users and wherein the interactive computing system is further configured to at least weight the link from other nodes in the composite directed graph to the fictional node such that the fictional node is ranked first after ranking the users with corresponding nodes included in the composite directed graph.

13. The system of claim 12, wherein the interactive computing system is further configured to at least filter the fictional node from the ordered list of users.

14. The system of claim 8, wherein a link between a first node and a second node in the composite directed graph is weighted based at least in part on a similarity between a first user associated with the first node and a second user associated with the second node.

15. The system of claim 8, wherein the interactive computing system is further configured to at least create a second composite directed graph associated with a second set of items from a second item category, and wherein a first item associated with a node in the composite directed graph is associated with a node in the second composite directed graph.

16. A computer-readable, non-transitory storage medium storing computer executable instructions that, when executed by one or more computing devices, configure the one or more computing devices to perform operations comprising:

identifying a set of items associated with an item category;

obtaining access time information for the set of items, the access time information including one or more access times for individual items from the set of items;

creating a composite directed graph based on the access time information the access time information including a relative temporal ordering of one or more item accesses by a set of users, wherein the composite directed graph comprises a set of nodes and a set of directed links, wherein individual nodes in the set of nodes is associated with a different user from the set of users, wherein individual users from the set of users accessed at least one item from the set of items, and wherein at least one directed link from the set of directed links points from a second node associated with a second user who accessed a second instance of an item from the set of items to a first node associated with a first user who accessed a first instance of the item from the set of items before the second user accessed the second instance;

performing a ranking process on the composite directed graph to obtain an ordered list of users;

identifying an early adopter set of users from the ordered list of users; and determining based at least in part on the composite directed graph that at least a threshold amount of users from the early adopter set of users accessed a digital item that is consumed via streaming; and adjusting a number of cache servers configured to cache the digital item based at least in part on the determination that at least the threshold amount of users from the early adopter set of users accessed the digital item.

17. The computer-readable, non-transitory storage medium of claim 16, wherein the composite directed graph is created from a plurality of discrete directed graphs, and wherein individual discrete directed graphs from the discrete directed graphs are associated with a different item from the set of items.

18. The computer-readable, non-transitory storage medium of claim 16, wherein the operations further comprise:

receiving an identity of a new item associated with the item category;

determining a percentage of the early adopter set of users who access the new item within a threshold time period; and in response to the percentage of the early adopter users who access the new item satisfying an access threshold, recommending the new item to another user.

19. The computer-readable, non-transitory storage medium of claim 18, wherein the access threshold is based at least in part on the item category.

20. The computer-readable, non-transitory storage medium of claim 16, wherein the operations further comprise:

receiving an identity of a new item associated with the item category;

determining a percentage of the early adopter set of users who access the new item; and determining an inventory threshold based at least in part on the percentage of the early adopter set of users who access the new item, wherein the inventory threshold is used to determine the number of instances of the new item to maintain in an inventory.

* * * * *